US012663996B2

(12) United States Patent
Rathinasamy et al.

(10) Patent No.: US 12,663,996 B2
(45) Date of Patent: Jun. 23, 2026

(54) PROXIMITY BOOT CONTROL USING LIGHT-BASED COMMUNICATIONS

(71) Applicant: Dell Products L.P., Round Rock, TX (US)

(72) Inventors: Shree Rathinasamy, Round Rock, TX (US); Padmanabhan Narayanan, Chennai (IN); Maxim Balin, Gan—Yavne (IL)

(73) Assignee: Dell Products L.P., Round Rock, TX (US)

( * ) Notice: Subject to any disclaimer, the term of this patent is extended or adjusted under 35 U.S.C. 154(b) by 91 days.

(21) Appl. No.: 18/450,134

(22) Filed: Aug. 15, 2023

(65) Prior Publication Data

US 2025/0060970 A1     Feb. 20, 2025

(51) Int. Cl.
*G06F 9/4401* (2018.01)
*H04B 10/116* (2013.01)

(52) U.S. Cl.
CPC ......... *G06F 9/4401* (2013.01); *H04B 10/116* (2013.01)

(58) Field of Classification Search
None
See application file for complete search history.

(56) References Cited

U.S. PATENT DOCUMENTS

| | | | | |
|---|---|---|---|---|
| 2006/0077177 | A1* | 4/2006 | Kirtley ............... | G06F 3/03543 |
| | | | | 345/163 |
| 2017/0104531 | A1* | 4/2017 | Aggarwal ........... | H05B 47/199 |
| 2019/0384916 | A1* | 12/2019 | Shah ................... | G06F 21/575 |

OTHER PUBLICATIONS

Haas, Harald, et al., "What is LiFI 48 . " Journal of Lightwave Technology 34.6, pp. 1533-1544, Mar. 15, 2016.

\* cited by examiner

*Primary Examiner* — Andrew J Jung
*Assistant Examiner* — Cole Jiawei Wentzel
(74) *Attorney, Agent, or Firm* — Ryan, Mason & Lewis, LLP

(57) ABSTRACT

Methods, apparatus, and processor-readable storage media for proximity boot control using light-based communications are provided herein. An example computer-implemented method includes maintaining information associated with at least one device, where the maintained information identifies at least one designated location for the at least one device. The method includes obtaining a request from the at least one device to perform a boot process, where the request is transmitted by the at least one device using light emitted by one or more light sources associated with a light-based network. The method also includes identifying a current location of the at least one device based on the request and determining whether to allow the at least one device to perform the boot process based at least in part on the maintained information and the current location.

20 Claims, 8 Drawing Sheets

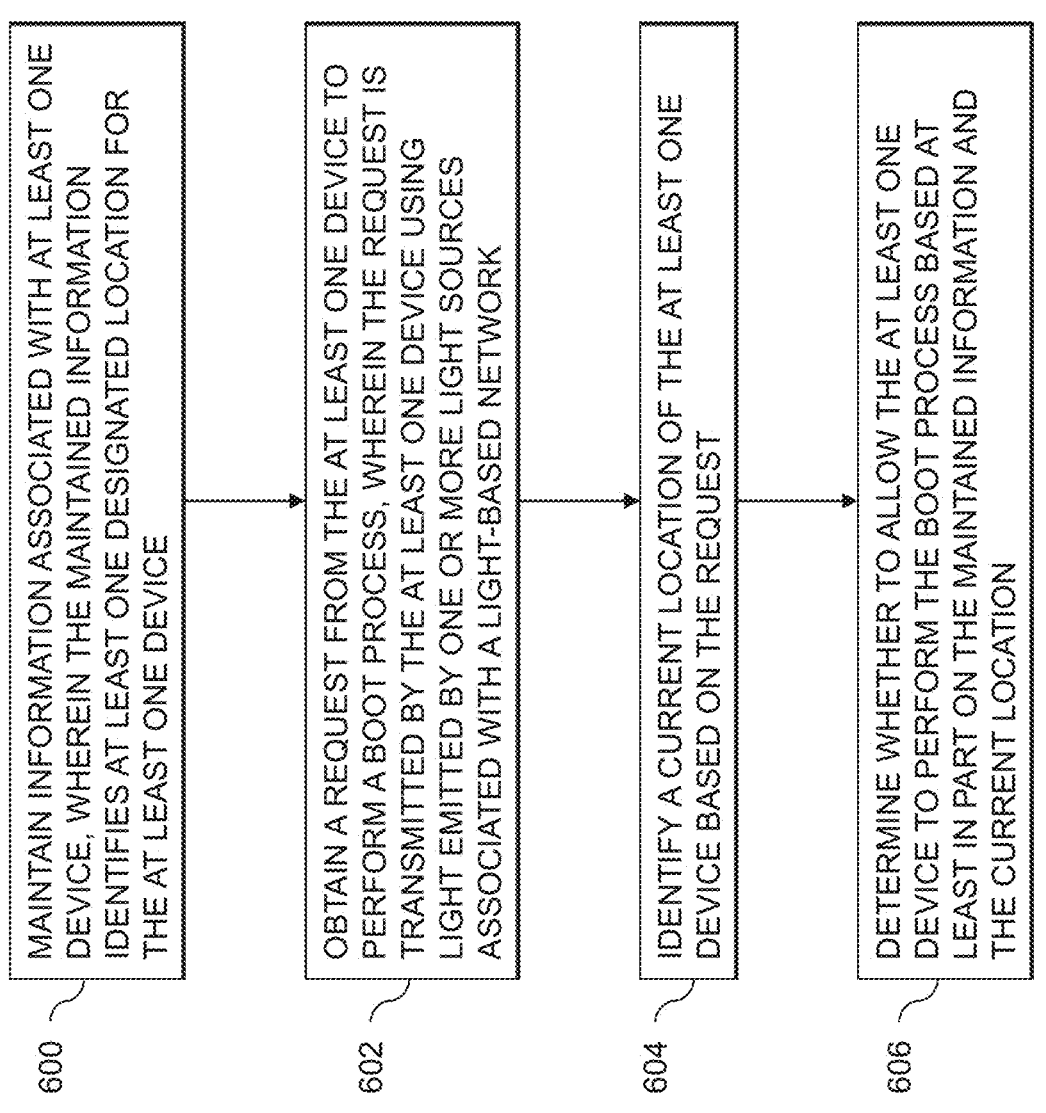

600 — MAINTAIN INFORMATION ASSOCIATED WITH AT LEAST ONE DEVICE, WHEREIN THE MAINTAINED INFORMATION IDENTIFIES AT LEAST ONE DESIGNATED LOCATION FOR THE AT LEAST ONE DEVICE

602 — OBTAIN A REQUEST FROM THE AT LEAST ONE DEVICE TO PERFORM A BOOT PROCESS, WHEREIN THE REQUEST IS TRANSMITTED BY THE AT LEAST ONE DEVICE USING LIGHT EMITTED BY ONE OR MORE LIGHT SOURCES ASSOCIATED WITH A LIGHT-BASED NETWORK

604 — IDENTIFY A CURRENT LOCATION OF THE AT LEAST ONE DEVICE BASED ON THE REQUEST

606 — DETERMINE WHETHER TO ALLOW THE AT LEAST ONE DEVICE TO PERFORM THE BOOT PROCESS BASED AT LEAST IN PART ON THE MAINTAINED INFORMATION AND THE CURRENT LOCATION

FIG. 6

PROXIMITY BOOT CONTROL USING LIGHT-BASED COMMUNICATIONS

BACKGROUND

Computing environments face different types of threats. These threats may concern not only software of the computing environments but also the physical security of the computing environments. Challenges related to physical security are often magnified in edge computing environments.

SUMMARY

Illustrative embodiments of the disclosure provide techniques for proximity boot control using light-based communications. An exemplary computer-implemented method includes maintaining information associated with at least one device, where the maintained information identifies at least one designated location for the at least one device. The method includes obtaining a request from the at least one device to perform a boot process, where the request is transmitted by the at least one device using light emitted by one or more light sources associated with a light-based network. The method also includes identifying a current location of the at least one device based on the request and determining whether to allow the at least one device to perform the boot process based at least in part on the maintained information and the current location.

Illustrative embodiments can provide significant advantages relative to conventional security techniques. For example, technical problems associated with network security are mitigated in one or more embodiments by controlling boot processes of devices using light-based communications. At least some embodiments reduce security threats by controlling the location associated with devices connecting to the network.

These and other illustrative embodiments described herein include, without limitation, methods, apparatus, systems, and computer program products comprising processor-readable storage media.

BRIEF DESCRIPTION OF THE DRAWINGS

FIG. 6 shows a flow diagram of a process for proximity boot control using light-based communications in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Physical security is an important aspect of modern computing environments. For example, edge computing environments are often highly distributed and decentralized, with devices and/or components deployed in locations that are vulnerable to physical security threats. Physical security threats can include theft, vandalism, and unauthorized access, which can compromise the availability and/or security of the computing environment. Physical security can be particularly challenging in situations where components (e.g., edge servers) are remotely located or located in areas that are easily accessible (e.g., factory floors, retail shops, colocation facilities, or network closets). Such components can be stolen or mistakenly moved to the wrong location.

One or more embodiments can at least partially mitigate such challenges by utilizing visible light communication (VLC) technology to implement proximity control techniques. In some embodiments, VLC technology can be used as a boot control mechanism. For example, a given component can be assigned to an area in which it is authorized to boot based on one or more network segments of a VLC network.

Figure 1:
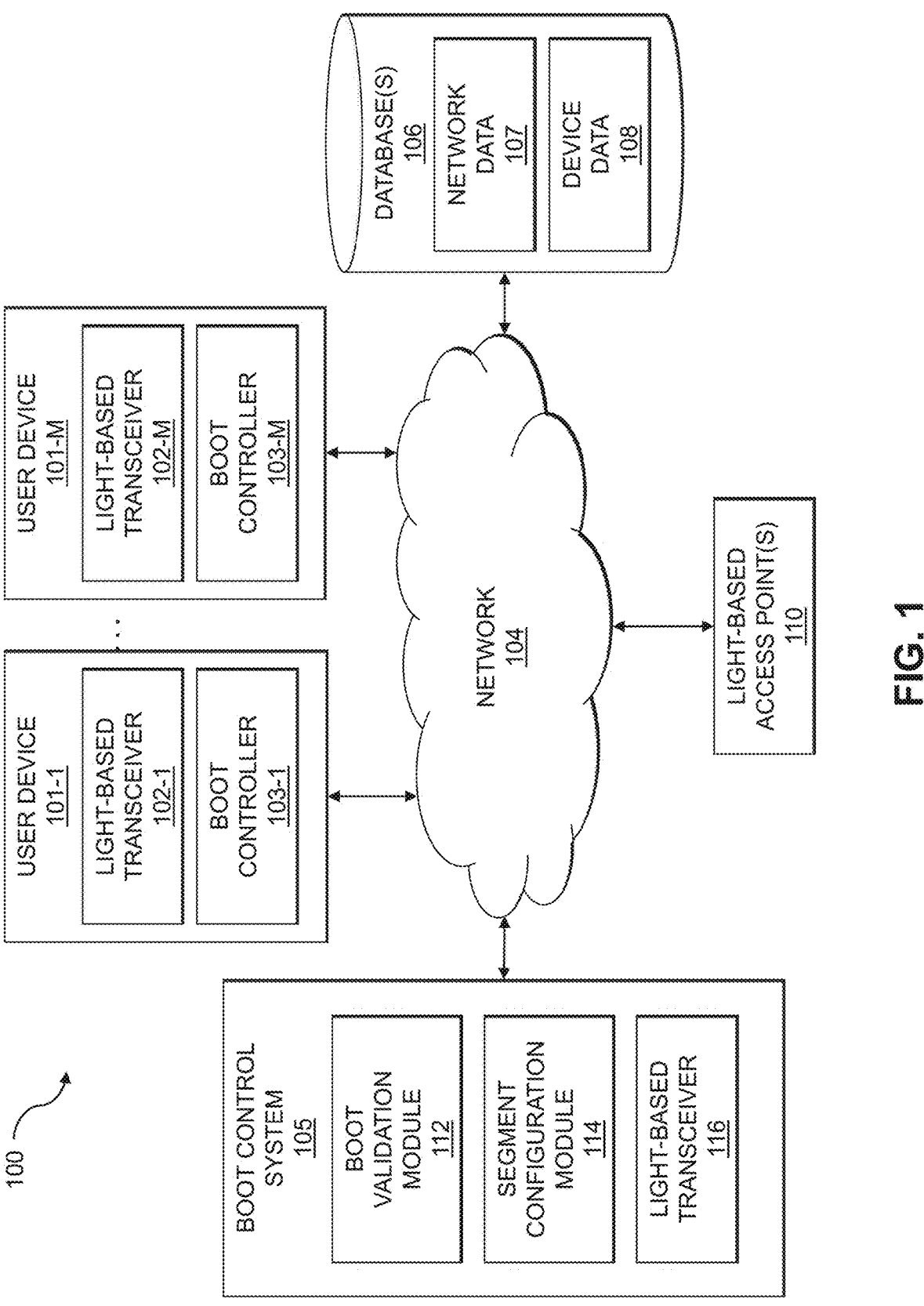
FIG. 1 shows an information processing system configured for proximity boot control using light-based communications in an illustrative embodiment.

FIG. 1 shows a computer network (also referred to herein as an information processing system) 100 configured in accordance with an illustrative embodiment. The computer network 100 comprises a plurality of user devices 101-1 . . . 101-M (collectively referred to herein as user devices 101) having respective light-based transceivers 102-1, . . . 102-M (collectively referred to herein as light-based transceivers 102) and respective boot controllers 103-1, . . . 103-M (collectively referred to herein as boot controllers 103). The user devices 101 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a boot control system 105 and one or more light-based access points 110.

Figure 2:
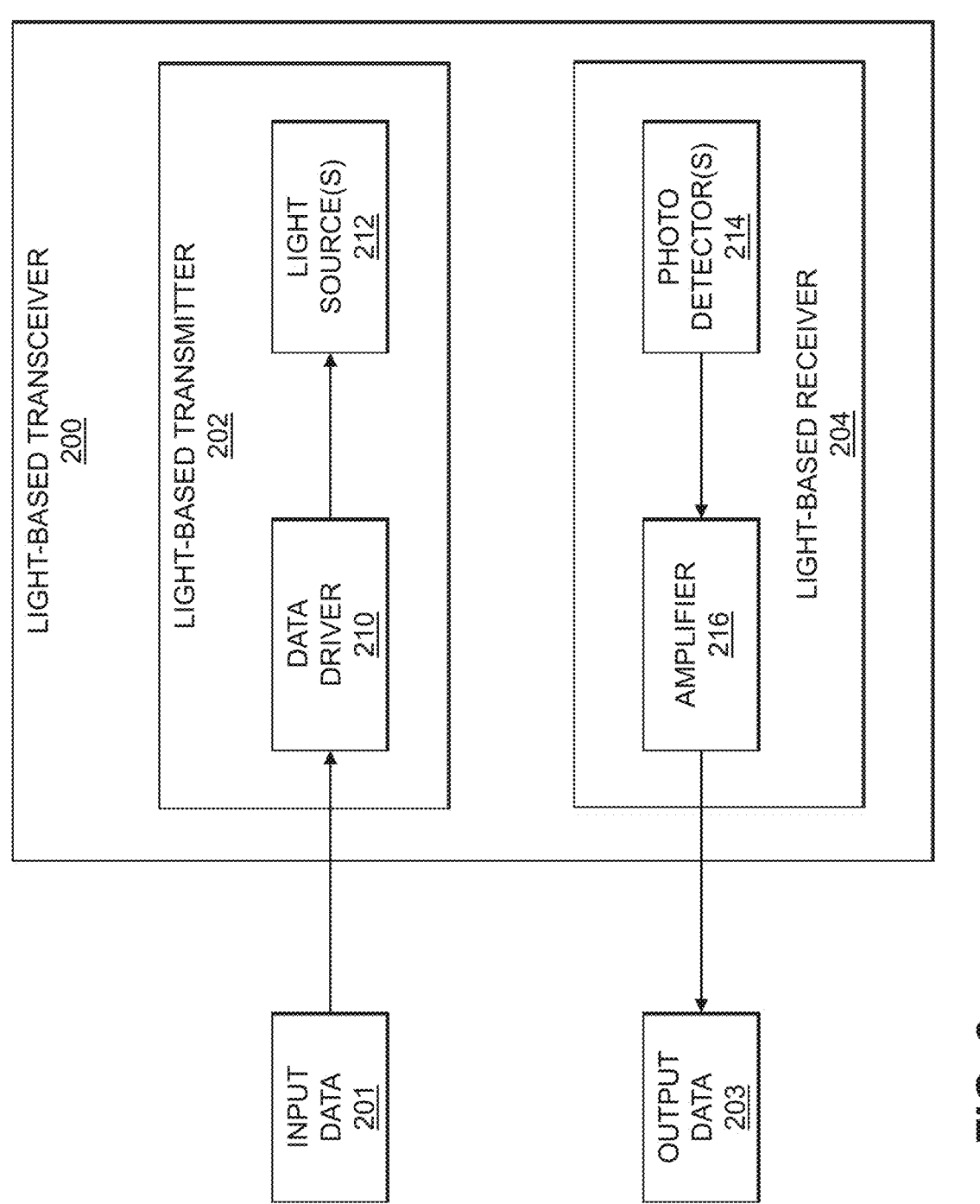
FIG. 2 shows an example of a light-based transceiver in an illustrative embodiment.

It is assumed that each of the light-based transceivers 102 in the FIG. 1 example comprises a light-based transmitter and a light-based receiver, as described in more detail in conjunction with FIG. 2, for example. In some embodiments, the light-based transceivers 102 may comprise light fidelity (LiFi) transceivers that enable bidirectional wireless communications based on light. For example, each of the light-based transceivers 102 may comprise one or more light sources (e.g., LED and/or infrared light sources) that are used for such communications. It is generally assumed that a given light source emits light within one or more portions of the visible light spectrum, the infrared spectrum, and/or the ultraviolet spectrum. As a non-limiting example, some embodiments can utilize light having wavelengths between 380 nm to 780 nm.

Each of the boot controllers 103 may be configured to perform a pre-boot process (also referred to as a power-on self-test (POST)). For example, each of the boot controllers 103 can be implemented as firmware and/or software that performs one or more tests to determine if the corresponding one of the user devices 101 is functioning properly. In some embodiments, each of the boot controllers 103 can perform an authentication process with one or more of the light-based access points 110. If the authentication process fails for a given one of the boot controllers 103, then the boot controller 103 prevents the corresponding user device 101 from booting. A non-limiting example of a pre-boot process is described in more detail in conjunction with FIG. 5.

The user devices 101 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 101 in some embodiments comprise respective computers associated with a particular company, organization, or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a LiFi, Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the boot control system 105 can have at least one associated database 106 configured to store data pertaining to, for example, network data 107 and device data 108. The network data 107 can include information related to one or more logical segments of a light-based communication network, which is used for communications by the light-based transceivers 102, for example. The device data 108 can include information related to mappings between one or more of the user devices 101 and respective ones of the logical segments.

In at least some embodiments, each of the light-based access points 110 may be configured to enable light-based communications on a given one of the logical segments of the light-based communication network, as explained in more detail elsewhere herein. As a non-limiting example, the light-based access points 110 can be implemented as LiFi access points, and thus can be associated with one or more additional light sources (not explicitly shown in FIG. 1).

An example database 106, such as depicted in the present embodiment, can be implemented using one or more storage systems associated with the boot control system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the boot control system 105 are one or more input-output devices, which illustratively comprise keyboards, displays or other types of input-output devices in any combination. Such input-output devices can be used, for example, to support one or more user interfaces to the boot control system 105, as well as to support communication between boot control system 105 and other related systems and devices not explicitly shown.

Additionally, the boot control system 105 in the FIG. 1 embodiment is assumed to be implemented using at least one processing device. Each such processing device generally comprises at least one processor and an associated memory, and implements one or more functional modules for controlling certain features of the boot control system 105.

More particularly, the boot control system 105 in this embodiment can comprise a processor coupled to a memory and one or more network interfaces.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The one or more network interfaces allow the boot control system 105 to communicate over the network 104 with the light-based access points 110 and/or the user devices 101, for example. The one or more network interfaces illustratively comprise one or more conventional transceivers and/or one or more light-based transceivers 116. The one or more light-based transceivers 116 can be implemented in a manner similar to that of light-based transceivers 102, for example.

The boot control system 105 further comprises a boot validation module 112, a segment configuration module 114, and a light-based transceiver 116.

Generally, the boot validation module 112 comprises functionality for obtaining requests from the user devices 101 and controlling respective boot processes of the user devices 101 based on the requests.

In some embodiments, the segment configuration module 114 can assign the one or more light-based access points 110 to respective ones of the network segments. For example, in some embodiments, the segment configuration module 114 can configure a given one of the light-based access points with a unique network identifier (ID) and corresponding security credentials to control whether given ones of the user devices 101 can connect to it. In at least some examples, the logical segments can be created based on respective physical locations of light-based access points 110 and/or barriers associated with light-based access points 110. The term "barrier" in this context and elsewhere herein is intended to be broadly construed so as to encompass any type of structure that blocks at least a portion of light that can be used by the light-based transceivers 102 and/or 116 for light-based communications. As non-limiting examples, such barriers can include structures that block substantially all of the light (e.g., a wall, a floor, and/or a ceiling) or structures that block only portions of light (e.g., an optical filter that can allow certain wavelengths of light to pass through it, while preventing other wavelengths of light).

It is to be appreciated that this particular arrangement of elements 112, 114, and 116 illustrated in the boot control system 105 of the FIG. 1 embodiment is presented by way of example only, and alternative arrangements can be used in other embodiments. For example, the functionality associated with the elements 112, 114, and 116 in other embodiments can be combined into a single module, or separated across a larger number of modules. As another example, multiple distinct processors can be used to implement different ones of the elements 112, 114, and 116 or portions thereof.

At least portions of elements 112, 114, and 116 may be implemented at least in part in the form of software that is stored in memory and executed by a processor.

It is to be understood that the particular set of elements shown in FIG. 1 for boot control system 105 involving user devices 101 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the boot control system 105, the light-based access points 110, and the at least one database 106 can be on and/or part of the same processing platform.

An exemplary process utilizing elements 112, 114, and 116 of an example boot control system 105 in computer network 100 will be described in more detail with reference to, for example, the flow diagram of FIG. 6.

FIG. 2 shows an example of a light-based transceiver 200 in an illustrative embodiment. In this example, the light-based transceiver 200 includes a light-based transmitter 202 and a light-based receiver 204. The light-based transmitter 202 includes a data driver 210 that obtains input data 201. Generally, the data driver 210 converts the input data 201 into a binary format so that it can be transmitted via one or more light sources 212. For example, the data driver 210 can implement one or more types of modulation schemes in order to transmit the input data 201. As non-limiting examples, at least one of the light sources 212 can be controlled to emit light having different intensity levels to indicate different values (e.g., a first intensity level can indicate a first binary value and a second intensity level can indicate a second binary value). In some examples, the different intensity levels are controlled so that the flickering of the light is not discernable by the human eye.

It is to be appreciated that the light-based transceiver 200 can be implemented in a LiFi system, which can utilize one or more types of modulation schemes (such as one or more types of single carrier modulation schemes and/or one or more types of multiple carrier modulation schemes). It is also to be appreciated that the one or more light sources 212, in some embodiments, can include overhead lighting and/or other types of lighting fixtures.

The light-based receiver 204 includes one or more photo detectors 214 that are configured to detect and convert light emitted by one or more light sources 212 (e.g., of another light-based transceiver 200) into electrical signals. In some embodiments, an amplifier 216 can be configured to amplify, demodulate, and decode the electrical signals in order to recover data transmitted by a light-based transmitter of another device, for example. The recovered data is then provided as output data 203.

According to some embodiments, a given device (e.g., user device 101-1) is allowed to boot or not based on one or more vicinities defined by logical segments of a light-based network. This can be particularly helpful in edge computing environments, where edge devices are often susceptible to various types of physical security challenges (e.g., theft, vandalism, unauthorized access, and/or misplacement).

Some embodiments allow a given edge device to be validated prior to the given edge device performing an operational task. If the given edge device is outside of a vicinity assigned to the edge device, then the given edge device is prevented from booting and/or performing one or more operational tasks, for example. This effectively tethers the edge device to a proximity range defined by one or more light sources (e.g., overhead LED lighting at an edge location). By way of example, a given edge device can be assigned to a particular vicinity so that it is configured to perform one or more operational tasks (e.g., causing one or more machines or devices to perform one or more operations), and other edge devices can be prevented from performing such tasks.

In some embodiments, logical segments of a light-based network can be enabled by splitting light into different light ranges, and devices can be tethered within a proximity range based on the one or more light sources. For example, the light ranges within the light-based communication network can be split using optical filters to isolate the edge devices (e.g., user devices 101) from each other. The light-based communication network can also be used to control locations associated with particular devices. Generally, an optical filter can be configured to selectively transmit or reject one or more wavelengths of light. For example, optical filters can split the light into respective ranges, and one or more of such ranges can be assigned to a given logical segment. A given device can then be assigned to one or more of the logical segments, for example.

An example of a process for splitting light ranges into logical segments using optical filters can include:

1. Identifying logical segments and devices that are to be assigned to those logical segments.
2. Configuring a network topology by creating a physical topology that separates the logical segments. For example, different access points (e.g., light-based access points 110) can be used for each logical segment and/or such access points can be physically separated by one or more barriers.
3. Defining optical filters that split the light spectrum into one or more desired ranges.
4. Configuring each access point with a respective unique network ID and security credentials. For example, each access point can be configured to allow only authorized devices to connect to it.

Figure 3:
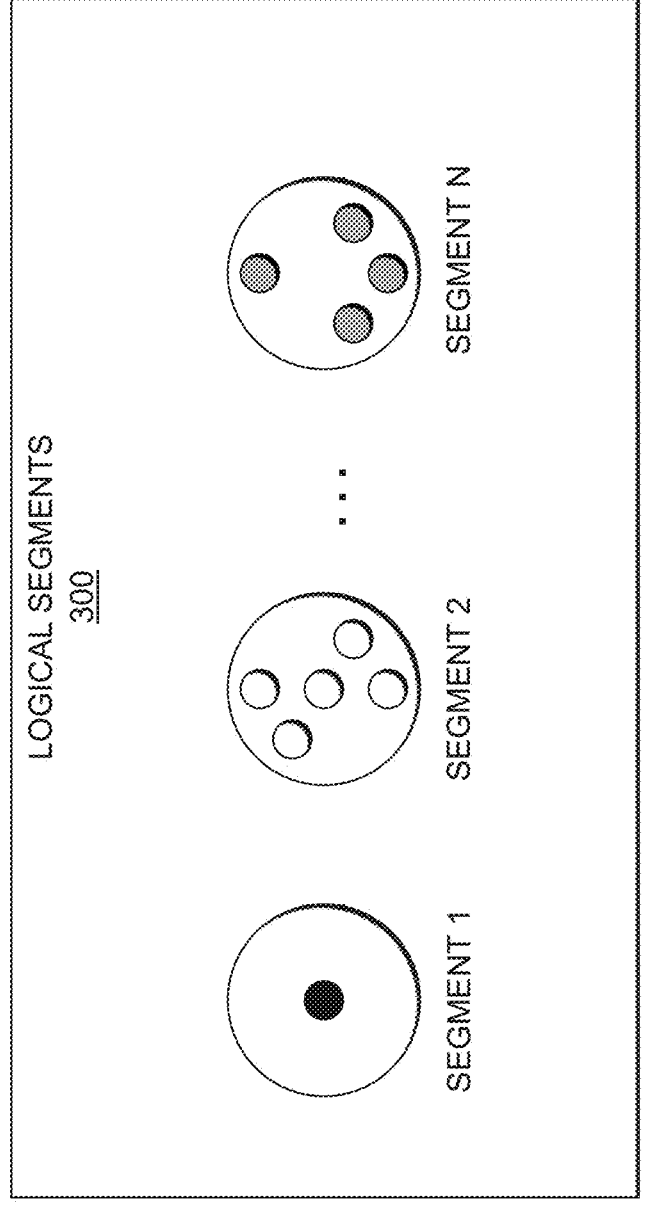
FIG. 3 shows an example of a segmented light-based communication network in an illustrative embodiment.

FIG. 3 shows an example of a segmented light-based communication network in an illustrative embodiment. In this example, the light-based communication network comprises a plurality of logical segments 300 (segments 1, 2, . . . . N). Each of the logical segments 300 is assigned respective sets of devices (e.g., corresponding to user devices 101), as indicated by the differently shaded circles within each of the logical segments 300. In at least some embodiments, each of the logical segments 300 can be associated with one or more physical areas, each possibly having a different size.

A given device can send a request that can be received by the communication network in one or more of the logical segments 300. For example, a device that is authorized to boot in segment 1 can send a request that is received by the communication network in segment 2. If the device is not authorized to boot in segment 2, then the communication network can prevent the device from booting and/or performing one or more operational tasks, such as by causing an authentication process to fail as described in more detail in conjunction with FIG. 5, for example. Accordingly, the device can only boot from designated locations.

It is to be appreciated that determining and/or identifying a location of a device is intended to be broadly construed so as to encompass, for example, determining that the device is in a particular area and/or a particular segment associated with a light-based communication network. In some examples, the location can be determined based at least in part on characteristics of light-based signals received and/or transmitted by the device.

Figure 4:
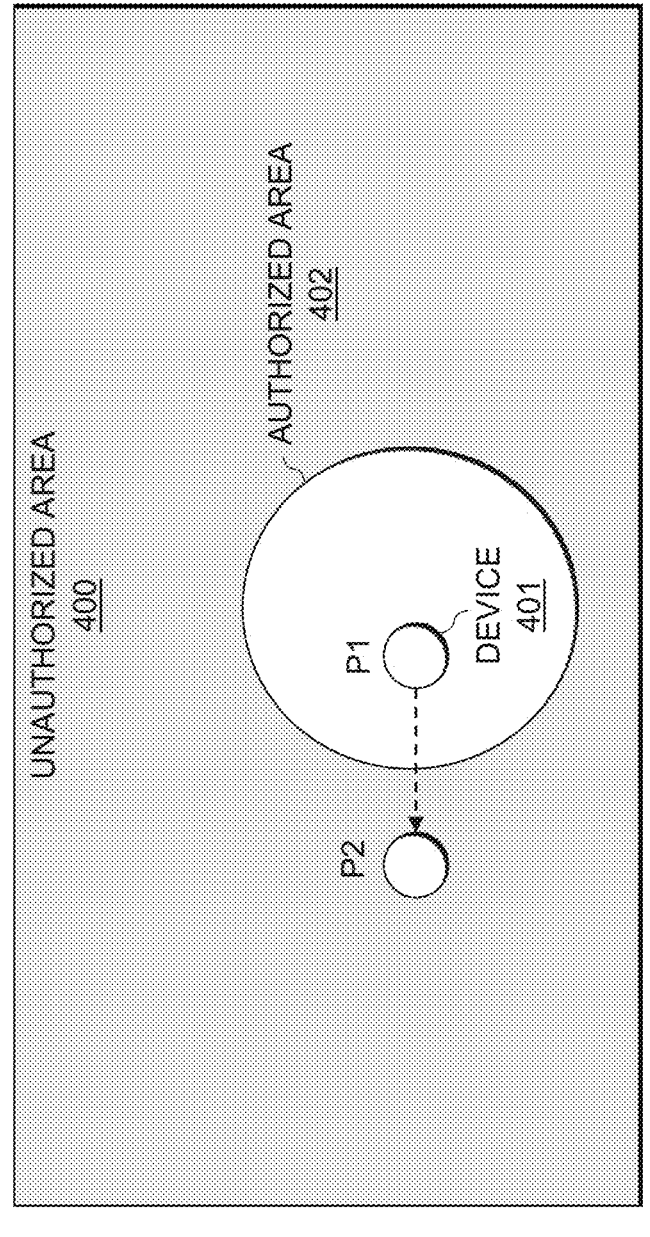
FIG. 4 shows an example of a boot control mechanism in an illustrative embodiment.

FIG. 4 shows an example of a boot control mechanism using light-based communications in an illustrative embodiment. In this example, it is assumed that a device 401 (e.g., corresponding to a given one of user devices 101) is assigned to a logical segment of a light-based communication network that corresponds to authorized area 402. For example, the authorized area 402 may be defined based on one or more characteristics of light that is emitted by one or more light sources in the authorized area 402. Accordingly, in some embodiments, the device 401 can be configured to access the light-based communication network based on the one or more characteristics of the light. As a non-limiting example, the one or more characteristics can correspond to a wavelength of light, wherein the device 401 is configured to communicate (e.g., send and/or receive a signal) on that wavelength. It is also assumed that the device 401 is not authorized to access the light-based communication network in an unauthorized area 400 (e.g., the additional portions of a building or other area, for example, outside of the authorized area 402), as indicated by the shading. If the device 401 is located at position P1 in the authorized area 402, then the device 401 can proceed to boot. However, if the device 401 moves to position P2 in the unauthorized area 400, then the device 401 is prevented from booting as it cannot access the light-based communication network.

Figure 5:
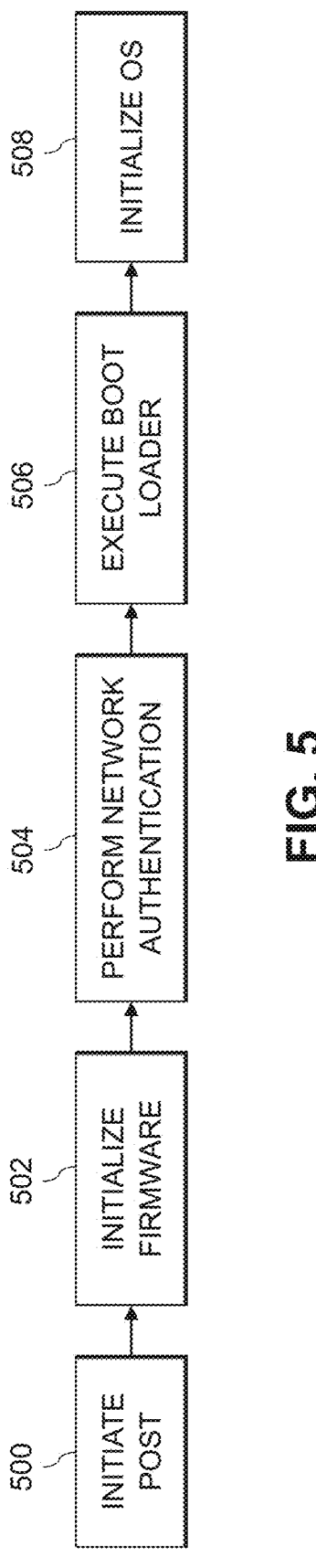
FIG. 5 shows an example of a boot authentication process using a light-based communication network in an illustrative embodiment.

FIG. 5 shows an example of a boot authentication process using a light-based communication network in an illustrative embodiment. The boot authentication process can be performed by the user device 101-1 using at least its boot controller 103-1, for example.

Step 500 includes initiating a power-on self-test (POST), and step 502 includes initializing firmware. For example, step 502 can include executing one or more instructions to initialize at least a portion of hardware associated with the device, including the light-based transceiver 102-1, for example.

Step 504 includes performing a network authentication. The network authentication process can include sending a request that is encoded and transmitted by its light-based transceiver 102-1. For example, the request can be sent using a particular configuration of light. As a non-limiting example, the configuration can be assigned (e.g., by a manufacturer or a system administrator) to the user device 101-1 prior to the device being connected or onboarded to the light-based communication network. The configuration, in some embodiments, can correspond to one or more of: a wavelength, a frequency, an intensity, and a polarization of the light. In at least some embodiments, the request can include a digital key associated with an access point of the light-based communication network. Accordingly, in at least one embodiment, step 504 is successful in response to the user device 101-1 being within an area of the light-based communication network that it is assigned (e.g., within the authorized area 402 of FIG. 4), and the digital key is validated. It is to be appreciated that one or more additional or alternative security mechanisms can also be used in step 504 (e.g., one or more cryptographic keys, one or more digital certificates, a public key infrastructure, etc.).

Step 506 includes executing a boot loader of the device, which is responsible for completing the boot process of the device. It is noted that if step 504 is not successful, then the boot loader is not executed. Step 508 includes initializing an operating system (OS) of the device.

It is to be appreciated that this particular process shows just one example implementation of a boot authentication process, and alternative implementations of the process can be used in other embodiments.

FIG. 6 is a flow diagram of a process for proximity boot control using light-based communications in an illustrative embodiment. It is to be understood that this particular process is only an example, and additional or alternative processes can be carried out in other embodiments.

In this embodiment, the process includes steps 600-606. These steps are assumed to be performed by the boot control system 105 utilizing its elements 112, 114, and 116.

Step 600 includes maintaining information associated with at least one device, wherein the maintained information identifies at least one designated location for the at least one device. Step 602 includes obtaining a request from the at least one device to perform a boot process, wherein the request is transmitted by the at least one device using light emitted by one or more light sources associated with a light-based network. Step 604 includes identifying a current location of the at least one device based on the request. Step 606 includes determining whether to allow the at least one device to perform the boot process based at least in part on the maintained information and the current location.

The maintained information may identify a plurality of logical segments of the light-based network, where each logical segment corresponds to a different set of light characteristics. The set of light characteristics for a given one of the plurality of logical segments comprises at least one of: a wavelength, a frequency, an intensity, and a polarization of the light. The identifying the current location of the at least one device may be based at least in part on the logical segment of the light-based network used by the at least one device to transmit the request. The set of light characteristics for at least one of the plurality of logical segments may be implemented at least in part using one or more optical filters. As a non-limiting example, a given optical filter can be implemented using a material (e.g., glass and/or plastic) that is configured to selectively transmit or reject one or more wavelengths of the light. The maintained information may include mappings between given ones of the plurality of logical segments and respective ones of a plurality of devices. The process may include performing an authentication process with the at least one device, wherein the determining is further based on a result of the authentication process. The determining whether to allow the at least one device to perform the boot process may be based on a comparison of the maintained information and the current location. The process may include preventing the at least one device from performing at least one of the boot process and one or more operational tasks based on the result of the determining. The at least one device may include an edge device in an edge computing environment.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve network security by controlling boot processes of devices using light-based communications. These and other embodiments can effectively reduce security threats by controlling access to particular areas of the network, controlling the location associated with devices connecting to the network, and reducing the likelihood of human mistakes.

Such advantages are illustrated in the following non-limiting examples. In one example, an industrial factory is assumed to have multiple edge devices that are spread throughout the industrial factory (which may be over thousands of square feet). A malicious user (e.g., an employee of the factory) moves a given one of the edge devices to a different location (e.g., a back room) with the intent to boot up and extract data from the device. At least some of the embodiments described herein can prevent the device from completing the boot process in the different location.

As another example, point-of-sale edge terminals are typically small and portable, which makes them easy to move and steal. Such terminals often can contain data (such as payment card information) that can be used for fraudulent purposes. The boot control techniques described herein can help prevent the data from being stolen from a given terminal if it is removed from an authorized vicinity.

As yet another example, a system administrator may attempt to install an edge device so that it can control a particular machine. Typically, operation damage and/or exposure of data may occur if the system administrator attempted to install the edge device so that it is associated with the wrong machine. Embodiments described herein can help mitigate such issues by validating a boot process of the edge device based on the intended location of the device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionalities within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
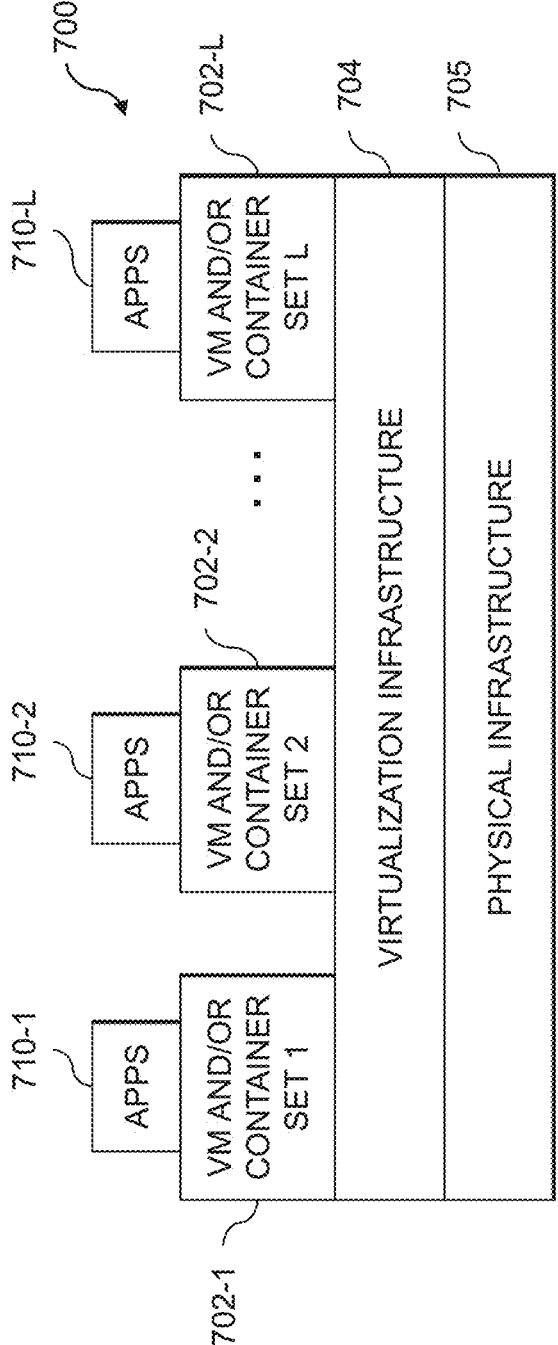
FIGS. 7 and 8 show examples of processing platforms that may be utilized to implement at least a portion of an information processing system in illustrative embodiments.
Figure 8:
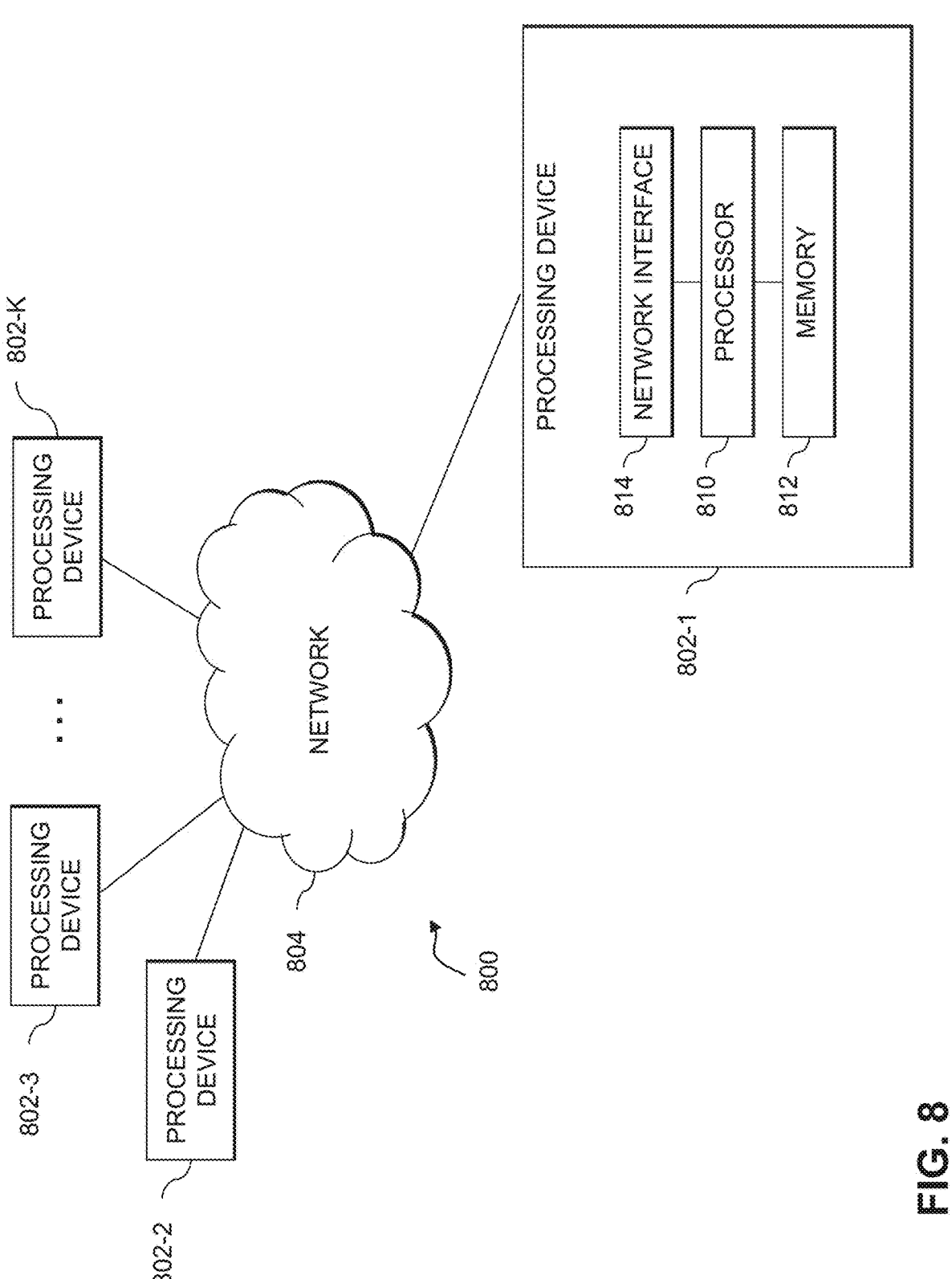

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2 . . . 710-L running on respective ones of the VMs/container sets 702-1, 702-2 . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an ASIC, an FPGA or other type of processing circuitry, as well as portions or combinations of such circuitry elements.

The memory 812 comprises RAM, ROM or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

maintaining information associated with at least one device, wherein the maintained information identifies (i) at least one designated location for the at least one device and (ii) a plurality of logical segments of a light-based network, each logical segment corresponding to a different set of light characteristics, wherein the plurality of logical segments is implemented at least in part by splitting the light emitted by one or more light sources into a plurality of wavelength ranges and assigning a respective one of the wavelength ranges to each logical segment;

obtaining, as part of a network authentication process performed after initialization of firmware on the at least one device, a request from the at least one device to execute a boot loader to complete a boot process, wherein the request is transmitted by the at least one device using light emitted by the one or more light sources associated with the light-based network;

identifying a current location of the at least one device based at least in part on the logical segment of the light-based network used by the at least one device to transmit the request; and determining whether to allow the at least one device to execute the boot loader to complete the boot process based at least in part on the maintained information and the current location;

wherein the method is performed by at least one processing device comprising a processor coupled to a memory.

2. The computer-implemented method of claim 1, wherein the set of light characteristics for a given one of the plurality of logical segments comprises at least one of: a wavelength, a frequency, an intensity, and a polarization of the light.

3. The computer-implemented method of claim 1, wherein the set of light characteristics for at least one of the plurality of logical segments is implemented at least in part using one or more optical filters.

4. The computer-implemented method of claim 1, wherein the maintained information comprises:

mappings between given ones of the plurality of logical segments and respective ones of a plurality of devices.

5. The computer-implemented method of claim 1, wherein the request comprises a digital key associated with an access point of the light-based network, and wherein the network authentication process with the at least one device comprises validating the digital key.

6. The computer-implemented method of claim 1, wherein the determining whether to allow the at least one device to execute the boot loader to complete the boot process is based on a comparison of the maintained information and the current location.

7. The computer-implemented method of claim 1, further comprising:

preventing the at least one device from performing at least one of: completing the boot process and one or more operational tasks based on the result of the determining.

8. The computer-implemented method of claim 1, wherein the at least one device comprises an edge device in an edge computing environment.

9. A non-transitory processor-readable storage medium having stored therein program code of one or more software programs, wherein the program code when executed by at least one processing device causes the at least one processing device:

to maintain information associated with at least one device, wherein the maintained information identifies (i) at least one designated location for the at least one device and (ii) a plurality of logical segments of a light-based network, each logical segment corresponding to a different set of light characteristics, wherein the plurality of logical segments is implemented at least in part by splitting the light emitted by one or more light sources into a plurality of wavelength ranges and assigning a respective one of the wavelength ranges to each logical segment;

to obtain, as part of a network authentication process performed after initialization of firmware on the at least one device, a request from the at least one device to execute a boot loader to complete a boot process, wherein the request is transmitted by the at least one device using light emitted by one or more light sources associated with the light-based network;

to identify a current location of the at least one device based at least in part on the logical segment of the light-based network used by the at least one device to transmit the request; and to determine whether to allow the at least one device to execute the boot loader to complete the boot process based at least in part on the maintained information and the current location.

10. The non-transitory processor-readable storage medium of claim 9, wherein the set of light characteristics for a given one of the plurality of logical segments comprises at least one of: a wavelength, a frequency, an intensity, and a polarization of the light.

11. The non-transitory processor-readable storage medium of claim 9, wherein the set of light characteristics for at least one of the plurality of logical segments is implemented at least in part using one or more optical filters.

12. An apparatus comprising:

at least one processing device comprising a processor coupled to a memory;

the at least one processing device being configured: to maintain information associated with at least one device, wherein the maintained information identifies (i) at least one designated location for the at least one device and (ii) a plurality of logical segments of a light-based network, each logical segment corresponding to a different set of light characteristics, wherein the plurality of logical segments is implemented at least in part by splitting the light emitted by one or more light sources into a plurality of wavelength ranges and assigning a respective one of the wavelength ranges to each logical segment;

to obtain, as part of a network authentication process performed after initialization of firmware on the at least one device, a request from the at least one device to execute a boot loader to complete a boot process, wherein the request is transmitted by the at least one device using light emitted by the one or more light sources associated with the light-based network;

to identify a current location of the at least one device based at least in part on the logical segment of the light-based network used by the at least one device to transmit the request; and to determine whether to allow the at least one device to execute the boot loader to complete the boot process based at least in part on the maintained information and the current location.

13. The apparatus of claim 12, wherein the set of light characteristics for a given one of the plurality of logical segments comprises at least one of: a wavelength, a frequency, an intensity, and a polarization of the light.

14. The apparatus of claim 12, wherein the set of light characteristics for at least one of the plurality of logical segments is implemented at least in part using one or more optical filters.

15. The apparatus of claim 12, wherein the maintained information comprises:

mappings between given ones of the plurality of logical segments and respective ones of a plurality of devices.

16. The apparatus of claim 12, wherein the request comprises a digital key associated with an access point of the light-based network, and wherein the network authentication process with the at least one device comprises validating the digital key.

17. The apparatus of claim 12, wherein the determining whether to allow the at least one device to execute the boot loader to complete the boot process is based on a comparison of the maintained information and the current location.

18. The apparatus of claim 12, wherein the at least one processing device is further configured:

to prevent the at least one device from performing at least one of: completing the boot process and one or more operational tasks based on the result of the determining.

19. The computer-implemented method of claim 1, wherein at least one access point of the light-based network includes an optical filter configured to selectively transmit and/or reject one or more wavelengths, wherein the optical filter splits a light spectrum into the plurality of wavelength ranges assigned to the plurality of logical segments.

20. The non-transitory processor-readable storage medium of claim 9, wherein at least one access point of the light-based network includes an optical filter configured to selectively transmit and/or reject one or more wavelengths, wherein the optical filter splits a light spectrum into the plurality of wavelength ranges assigned to the plurality of logical segments.

* * * * *